DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 10

T929,007
STRAIGHT DOUGH BAKING PROCESS
Ronald F. Czarnecki, 408 Oakmont Drive,
Kingsport, Tenn. 37663
Filed Feb. 28, 1974, Ser. No. 446,871
Int. Cl. A21d *2/16*
U.S. Cl. 426—24
No Drawing. 8 Pages Specification

An improved straight dough process is disclosed for preparing yeast-leavened baked goods. Succinylated monoglycerides are used as an additive in the bake mix to improve such properties as machinability, loaf volume and grain score. Succinylated monoglycerides are added to the bake mix in amounts of from about 0.1% to about 0.5% by weight of the flour prior to baking.